United States Patent [19]

Hara et al.

[11] Patent Number: 4,486,502

[45] Date of Patent: Dec. 4, 1984

[54] RESIN-COATED CARRIER FOR USE IN TWO-COMPONENT ELECTROPHOTOGRAPHIC DEVELOPERS

[75] Inventors: Kenkichi Hara, Shibukawa; Shigeo Yokoe; Kazuyoshi Oka, both of Maebashi; Tamotsu Murakami; Tsugifusa Hashimoto, both of Kawasaki, all of Japan

[73] Assignees: Kanto Denka Kogyo Co. Ltd., Tokyo; Tokyo Shibaura Denki Kabushiki Kaisha, Kanagawa, both of Japan

[21] Appl. No.: 455,540

[22] Filed: Jan. 4, 1983

[30] Foreign Application Priority Data

Jan. 4, 1982 [JP] Japan ..................................... 57-153

[51] Int. Cl.[3] ......................... C08F 15/40; G03G 9/10

[52] U.S. Cl. .................................... 428/405; 428/407; 430/106.6; 430/108

[58] Field of Search ...................... 430/106.6, 109, 110; 428/405, 407

[56] References Cited

U.S. PATENT DOCUMENTS

| | | | |
|---|---|---|---|
| 3,876,587 | 4/1975 | Matsui et al. | 525/387 |
| 4,265,992 | 5/1981 | Kouchi et al. | 430/109 |
| 4,390,609 | 6/1983 | Wiedemann | 430/66 |

*Primary Examiner*—John E. Kittle
*Assistant Examiner*—John L. Goodrow
*Attorney, Agent, or Firm*—Browdy and Neimark

[57] ABSTRACT

A carrier for use as a component in electrophotographic two-component developers which is improved in durability of the triboelectric property by coating the surface of the iron core particles of carrier with a resinous composition comprised essentially of an epoxy-hydroxy hydrocarbon resin and a silicone resin.

6 Claims, No Drawings

RESIN-COATED CARRIER FOR USE IN TWO-COMPONENT ELECTROPHOTOGRAPHIC DEVELOPERS

BACKGROUND OF THE INVENTION

This invention relates to a carrier for use in electrophotographic two-component developers comprising the carrier as a component together with a toner component. In particular, the present invention relates to a coated carrier having excellent durability in the magnetic brush developing process of electrophotography.

In one of the electrophotographic methods, a dry, two-component developer comprising a toner component in combination with a carrier component is used in the magnetic brush developing process to develop a static image formed latently on a light sensitive substrate. Commonly, the developer comprises toner particles having sizes in a relatively fine range and carrier particles having sizes in a relatively coarse range. The static attraction between the opposite polarites generated by contact of these particles holds the fine toner particles on the surface of the coarse carrier particles. When the thus statically charged developer is brought into contact with a latent static image which has been formed on a light sensitive substrate, part of the charged toner particles are statically attracted and transferred to the latent image to produce a corresponding visible image. Therefore, the toner particles should have an appropriate triboelectric property so that they hold a sufficient charge to ensure the precisely selective transfer thereof to the latently imaged area.

When the conventional dry, two-component developers are used for a period of time in the electrophotographic developing process, there has been a tendency that the toner or dust thereof soils the surface of the carrier particles to eventually form a stiff continuous film of toner material on said surface due to repeated contacts and impingements between the carrier and toner particles and between these particles and mechanical parts of the developing apparatus. Once such a film has been formed, the accumulation of toner material on the respective carrier particles becomes gradually heavier. Then, the triboelectric charge of developer which has been generated by contact of the bare surface of the carrier particles with the toner particles is replaced by the triboelectric charge which is now generated by contact of the toner-coated surface of the carrier particles with the toner particles, i.e. by toner-toner contact. Thus, the triboelectric property obtained by the fresh developer is seriously impaired. Consequently, the quality of the final reproduced copies becomes poor due to the soiling of the back ground with a significant amount of toner resulting from the impaired triboelectric property.

Hitherto, it has been proposed to remove or partly obviate the above difficulties by modifying the carrier, for example, by coating the surface of the carrier particles (or the core material) with a material having low surface energy, such as silicone resin (see for example Japanese Patent Publication 44-27879 and Japanese Patent Public Disclosure (KOKAI) 50-2543). With the proposed techniques, the undesirable soiling and accumulation of the toner material on the surface of the carrier particles are inhibited considerably. However, in the product carrier coated with a silicone resin, generally the coating layer has poor adhesion to the core materials, such as iron powder. Also, the coating layer exhibits mechanical strength insufficient to withstand well the friction and shock to which the developer is subjected during the use. Therefore, in a continuous operation for a long period of time, the silicone layer coated on the surface of cores becomes worn out or detached from the cores. Thus, the cores with the bare surfaces are exposed to the toner. Then, the initial triboelectric charge which has been generated by contact of the silicone-coated core particles with the toner particles is replaced gradually by the triboelectric charge generated by contact of the bare core particles with the toner particles. Accordingly, the initial triboelectric property of the fresh developer again can not be maintained at a constant level during prolonged use and the resulting variation in the triboelectric property will adversely affect the quality of reproduced copies.

SUMMARY OF THE INVENTION

The present invention is directed to an improved electrophotographic carrier which obviates or substantially mitigates the difficulties experienced with the prior art carriers.

It is an object of the present invention to provide an improved electrophotographic carrier on the surface of which a stiff film of toner material is not formed during the use in developing.

It is a further object of the present invention to provide an improved electrophotographic carrier which comprises an iron powder core material coated with a resinous layer having high mechanical strength and adhering strongly to the core.

It is a still further object of the present invention to provide an improved electrophotographic carrier which generates with the toner particles substantially a constant triboelectric charge throughout a long operable life thereof.

We have found that these and other objects of the present invention can be achieved with an electrophotographic carrier prepared by coating a core material with a resinous composition comprised essentially of an epoxy-hydroxy hydrocarbon resin and a silicone resin. It has been also found that the coated carrier has surprisingly improved durability.

Though the resinous coating compositions which may be used in the present invention are comprised essentially of the specified two resin components, the coating compositions may contain, if desired, additionally one or more optional ingredients such as other resins and/or additives and/or modifiers which are well known in the art.

The present carrier may be prepared by (a) either immersing a core material iron powder in a resinous solution of an epoxy-hydroxy hydrocarbon resin, a silicone resin and, if desired, an optional ingredient dissolved in a solvent, such as toluene, a xylene, methylethyl ketone, ethyl acetate, or spraying such a resinous solution over a fluidized bed of the core material and (b) heating and drying the thus coated core material at an appropriately elevated temperature to cause crosslinking of the coatings.

Though the total concentration of the resins in the coating solution may be varied over a wide range, where the solution is sprayed, the concentration is preferably in the range of about 2–10% by weight of the solution in view of the flowability suitable for handling the solution and of the acceptable efficiency obtained in the heating-drying step.

The epoxy-hydroxy hydrocarbon resins which may be used in the present invention include ones derived from polymers of diene compounds through the epoxydation and hydroxylation thereof. A preferred example of the epoxy-hydroxy hydrocarbon resins is a normally solid polymer which is prepared by cationic polymerization of 1,3-pentadiene and subsequent introduction of epoxy and hydroxyl groups into the polymeric intermediate. Preferably, the product resin has a hydroxyl equivalent of about 500–1200 and an epoxy equivalent of about 400–1000.

Commercially available epoxy-hydroxy hydrocarbon resins suitable for use in the present invention include those which are sold under trade names of "LPHX 1060", "LPHX 2060" and "LPHX 2100" by Asahi Denka Kogyo Co., Ltd. (Japan).

The silicone resins which may be used in the present invention are of a thermosetting type. Commercially available silicone resins suitable for the present coating composition are, for example, silicone varnishes sold under trade names of "KR 214", "KR 201", "KR 206", "SA-4", "ES 1001 N", "KR 3093", and "KR 5203" by Shin-etsu Kagaku Kogyo Co., Ltd. (Japan).

In order to provide a coating layer of an appropriate thickness on the surface of the core particles, the proportion of the resinous coating composition applied to the core material should be preferably about 0.05–2% by weight, more preferably about 0.1–1% by weight of the core material (on dry basis).

The proportion of the epoxy-hydroxy hydrocarbon resin in the resinous composition is preferably 1–30% by weight (on dry basis). More preferably the epoxy-hydroxy hydrocarbon is used at a level of 2–10% by weight in the composition, since the resulting layer exhibits a significantly strong adhesion to the core particles and has maximum mechanical strength within the range. Where the epoxy-hydroxy hydrocarbon resin is present at a level less than 2% in the composition, the coating layer tends to exhibit a slightly decreased adhesion to the core. On the other hand, when the epoxy resin is present at a level greater than 10% by weight, though the adhesion is satisfactory, the mechanical strength decreases slightly.

The core material used in the present invention is preferably an iron powder having a particle size in the range of about 30–200 microns. Examples of the iron powders suitable for use in the present invention include pure metallic iron powders, such as chemically reduced iron powder, atomized iron powder and electrolytic iron powder; iron alloy powders; and partially oxidized iron powders produced by oxidizing the iron powders in the surface region of the respective particles.

The toner which is used in combination with the present carrier may be selected from the wide range of conventional toners which comprise a binder (a naturally occurring and/or synthetic polymer), a colorant (a dye and/or pigment) and any optional modifier and/or additive as well known in the art.

In the present carrier, the coating layer is bonded to the surface of the iron powder core particles and exhibits improved mechanical properties. Thus, the present carrier resists wear and other physical damage during use and can maintain the initial smooth surface for a prolonged period of time. This means that the carrier is freed from the formation of any stiff film of toner material on the surface thereof and that the triboelectric charge generated between the carrier and toner particles remains substantially constant for a long period of use.

DESCRIPTION OF THE PREFERRED EMBODIMENTS

The present invention will be described further with reference to the following Examples which should not be considered as limitations on the present invention. It will be appreciated that modification of the illustrated embodiments is possible in many aspects without departing from the scope of the invention as defined in the attached claims. In the Examples, all "parts" are "parts by weight" unless otherwise indicated.

EXAMPLE 1

A coating solution was prepared by dissolving 20 parts of a silicone resin "KR 201" (ex Shin-etsu Kagaku Kogyo, solids contents: 50%) and 1 part of an epoxy-hydroxy hydrocarbon resin "LPHX 2100" (ex Asahi Denka, epoxy equivalent: 850, hydroxyl equivalent: 610) in 200 parts of methylethyl ketone.

A core material comprising iron particles in flake-like irregular form in the size range of 44–149 microns and having an apparent density of 2.71 grs./cm$^3$ (200 parts) was charged to a fluidized-bed coating apparatus and the above prepared solution was sprayed into the fluidized bed using an air stream at 40° C. After the spraying was finished, the temperature of the air stream was elevated to 150° C. for 1 hour to give an electrophotographic carrier according to the present invention.

A developer was prepared by mixing 1000 parts of the carrier and 40 parts of a commercially available toner for magnetic brush development (designated to be used in Toshiba "BD 3504" electrophotographic machine) in a 1 liter polyethylene bottle for 1 hour at 75 r.p.m.

When the developer was used to develop a latent static image formed on an Se light sensitive plate, the reproduced visual images were free from fog density and had a high resolution. Even after reproduction of 50,000 copies, the initial quality of copy was well maintained.

EXAMPLE 2

A coating liquid was prepared by dissolving 30 parts of a silicone resin ("ES-1001 N" ex Shin-etsu Kagaku, solids content: 45%) and 1.3 parts of an epoxy-hydroxy hydrocarbon resin ("LPHX 2060" ex Asahi Denka, epoxy equivalent=430, hydroxyl equivalent=980) in 200 parts of methylethyl ketone.

An iron powder (2000 parts) comprising particles in rounded irregular form in the size range of 44–149 microns and having an apparent density of 2.90 grs./cm$^3$ was charged to a fluidized-bed coating apparatus. The above prepared coating liquid was sprayed into the fluidized bed of iron powder using an air stream at 40° C. On completion of the spraying, the temperature of the introduced air stream was raised to 150° C. for 1 hour to produce a carrier according to the present invention.

A developer was prepared using 1,000 parts of the carrier and used for developing a latent static image on an Se light sensitive plate by the procedure as described in Example 1.

The reproduced copies were found to be free from fog and to have a high quality. The excellent initial quality of copy was well maintained even after reproduction of 50,000 copies.

EXAMPLE 3

The procedure of Example 2 was repeated except that the iron powder core material was replaced by an iron powder comprising particles in flake-like irregular form which had been subjected to partial oxidation to an extent of an oxygen content of 0.92%.

The results were similar to those obtained in Example 2. Again, even after reproduction of 50,000 copies, the initial copy quality was maintained.

COMPARATIVE EXAMPLE

A carrier was prepared in accordance with the procedure as described in Example 1 except that the coating solution was prepared using the silicone resin only as a resin component and did not contain the epoxy-hydroxy hydrocarbon resin. A developer was formulated using the carrier and used for developing a latent static image by the procedure of Example 1.

Though, clear copies were reproduced during the initial stage, the copies became foggy and unclear after reproduction of about 16,000 copies.

Example 2 was repeated except that the epoxy-hydroxy hydrocarbon resin was omitted in the preparation of the coating solution. After reproduction of about 20,000 copies, the reproduced copies became poor.

What is claimed is:

1. A carrier for use with toner in a two component electrophotographic developer which comprises a particulate core material coated with a resinous composition consisting essentially of an epoxy-hydroxy hydrocarbon resin and a silicone resin.

2. A carrier as claimed in claim 1 in which the resinous composition comprises from 1% to 30% by weight of the epoxyhydroxy hydrocarbon resin.

3. A carrier as claimed in claim 1 or 2 in which the epoxy-hydroxy hydrocarbon resin has a hydroxyl equivalent of from 500 to 1200 and an epoxy equivalent of from 400 to 1000.

4. An electrophotographic developer comprising a toner and a carrier as claimed in any one of the preceding claims.

5. The carrier of claim 3, wherein the epoxy-hydroxy hydrocarbon resin comprises a normally solid polymer prepared by the cationic polymerization of 1, 3-pentadiene with subsequent introduction of epoxy and hydroxyl groups into the polymeric intermediate.

6. The carrier of claim 1, wherein the hydrocarbon resin is an epoxidized, hydroxylated diene polymer.

* * * * *